United States Patent
Her et al.

[11] Patent Number: 6,101,432
[45] Date of Patent: Aug. 8, 2000

[54] VEHICLE RATTLE DETECTION METHOD AND SYSTEM

[75] Inventors: Jenyuan Yuan Her, Novi; Ming-Ran Lee, Troy; Poyu Tsou, Canton, all of Mich.

[73] Assignee: Ford Global Technologies, Inc., Dearborn, Mich.

[21] Appl. No.: 09/443,274

[22] Filed: Nov. 18, 1999

[51] Int. Cl.[7] .................................. G01M 17/00
[52] U.S. Cl. .......................... 701/29; 701/111; 364/578; 73/35.09; 73/62; 73/69; 700/280
[58] Field of Search ...................... 701/29, 111; 364/578; 73/35.09, 62, 69; 700/280

[56] References Cited

U.S. PATENT DOCUMENTS

| | | |
|---|---|---|
| 3,695,098 | 10/1972 | Kirkland, Jr. . |
| 3,748,896 | 7/1973 | Barrows . |
| 3,844,175 | 10/1974 | Hixson . |
| 5,313,407 | 5/1994 | Tiernan et al. . |
| 5,434,783 | 7/1995 | Pal et al. . |
| 5,535,131 | 7/1996 | Sanders . |
| 5,551,298 | 9/1996 | Rayment . |
| 5,641,904 | 6/1997 | Kopp et al. . |
| 5,758,311 | 5/1998 | Tsuji et al. . |
| 5,877,414 | 3/1999 | Rui et al. ................................. 73/146 |

Primary Examiner—William A. Cuchlinski, Jr.
Assistant Examiner—Marthe Y. Marc-Coleman
Attorney, Agent, or Firm—David B. Kelley; Roger L. May

[57] ABSTRACT

Vehicle model rattle detection method and system process vibration displacement data of elements of a vehicle CAE model to predict rattle of the vehicle. The rattle detection method and system includes dividing a vehicle model into a plurality of elements and grids. The displacement data for each element as a function of vibration is then provided. The element-grid pairs which contact due to vibration are then determined using the displacement data. Contact velocity for each contacting element-grid pair due to vibration is then estimated. Rattle for each contacting element pair as a function of contact velocity is then determined. The displacement data includes magnitude data and phase data for each element as a function of vibration over time. A rattle index for each contacting element pair is generated, the rattle index is indicative of rattle severity.

17 Claims, 2 Drawing Sheets

VEHICLE RATTLE DETECTION METHOD AND SYSTEM

TECHNICAL FIELD

The present invention relates to vehicle rattle detection methods and systems.

BACKGROUND ART

Motor vehicle manufacturers aim to eliminate rattles, squeaks, and other undesired noises which might occur when a vehicle is in use. These noises occur when the vehicle is subjected to vibrations during use.

A number of different simulation systems have been developed to allow identification of noises on a test bed. Hydraulic actuator simulator tests are known in which a stationary vehicle has its wheels driven on sets of actuators. The vehicle is subjected to different frequencies of vibration by changing the excitation frequency of the actuators. Rattle noises resulting from the vibration are then listened for and measured.

An inherent problem with typical rattle detection system using vibration simulation systems is that these systems are for use with actual vehicles or near production vehicle prototypes. In essence, typical rattle detection systems resolve rattle issues through a find and fix approach after the vehicle has been designed and produced. As a result, design prevention of rattle events before a finished prototype is produced is limited to general guidelines and lessons learned from experience. The typical rattle detection systems provide no objective data to advocate proposed design suggestions.

Vehicle manufacturers use computer aided engineering (CAE) to design vehicles before actually building them. CAE allows vehicle manufacturers to study various different vehicle designs to determine the best design before actually building a vehicle incorporating the chosen design. Traditional CAE analysis only addresses vehicle structure concerns.

What is needed is a vehicle rattle detection method and system based on CAE, thereby enabling vehicle manufacturers to simulate the rattle, squeak, and other noises associated with different vehicle designs prior to actually building vehicles incorporating the vehicle designs.

DISCLOSURE OF INVENTION

It is an object of the present invention to provide a vehicle rattle detection method and system that process vibration displacement data of elements of a vehicle CAE model to predict rattle of the vehicle.

Accordingly, the present invention provides a method for detecting rattle of a vehicle model. The method includes dividing a vehicle model into a plurality of elements and grids. The displacement data for each grid of an element as a function of vibration is then provided. The element-grid pairs which contact due to vibration are then determined using the displacement data. Contact velocity for each contacting element-grid pair due to vibration is then estimated. Rattle for each contacting element-grid pair is then determined from contact velocity.

Preferably, the displacement data includes magnitude and phase data for each grid as a function of vibration. The method preferably further includes generating a rattle index for each contacting element-grid pair, the rattle index indicative of rattle element-grid severity.

Further, according to the present invention, there is provided a system for detecting rattle of a vehicle model. The system includes a database and a processor. The database stores displacement data as a function of vibration for each grid of a model. The processor is operable with the database for using the displacement data to determine element-grid pairs which contact due to vibration. The processor is further operable for estimating contact velocity for each contacting element-grid pair due to vibration, and for determining rattle for each contacting element-grid pair based on contact velocity.

BRIEF DESCRIPTION OF DRAWINGS

The present invention will now be described in further detail, and by way of example, with reference to the accompanying drawings, in which.

BEST MODE FOR CARRYING OUT THE INVENTION

Figure 1:
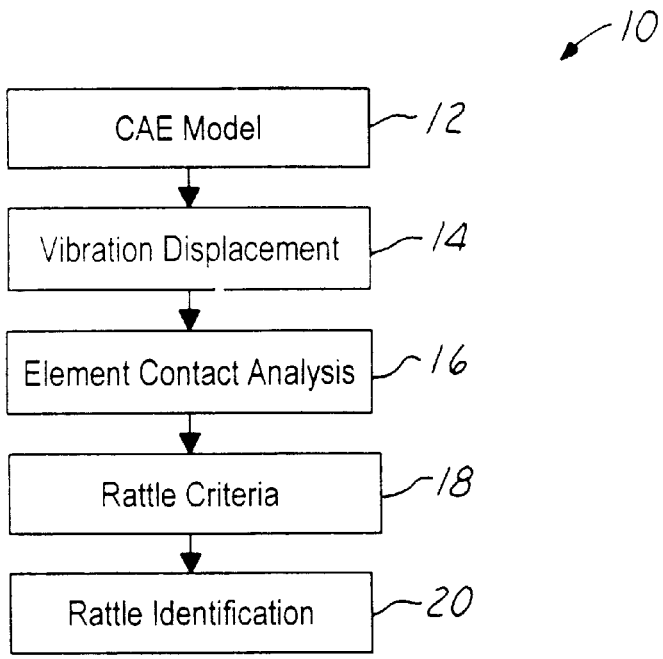
FIG. 1 is a functional block diagram of the rattle detection method and system of the present invention.

Referring now to FIG. 1, a functional block diagram 10 of the rattle detection method and system in accordance with the present invention is shown. Functional block diagram 10 illustrates the building blocks of the present invention.

In general, the present invention is a computer aided engineering (CAE) tool to be integrated into current CAE practices as a systematic approach of rattle design prevention. The present invention post processes standard CAE vehicle model vibration analysis results 12 to identify rattle locations caused by vehicle excitation or vibration. The standard CAE vehicle model results 12 include a list of elements and grids making up the vehicle model in a database. Each of the elements have a location in space. The standard CAE vehicle model also includes vibration displacement data 14 for the elements in a database. The vibration displacement data 14 for the elements indicates how much the elements vibrate under certain vehicle operating conditions. The vibration displacement data simulates the vibration level of the vehicle model under different operating conditions.

The vibration displacement data includes magnitude and phase data. The magnitude of displacement is indicative of the magnitude of the sinusoidal motion and is a function of vibration over time. Similarly, the phase is indicative of the phase relationship information among the grids as a function of vibration over time.

An element contact analysis processor 16 uses the vibration displacement data to determine which elements contact grids during vibration. For each contacting element-grid pair, element contact analysis processor 16 estimates the rate or velocity at which the elements contact one another. This is referred to as the contact velocity. Element contact analysis processor 16 captures the physics of rattle events.

Rattle is high frequency noise due to impact contact between elements or parts. The severity or magnitude of rattle is a function of the contact velocity. Rattle is frequently driven by low frequency vibration modes (system or local resonance).

Rattle criteria 18 is then applied to determine which contacting elements produce rattle concerns. Rattle criteria 18 is used to produce a rattle index for each contacting element-grid pair. The rattle index is indicative of the severity or magnitude of the rattle for each contacting element-grid pair. Rattle identification 20 uses the rattle index for each contacting element-grid pair to generate a mapping showing the severity of rattle at each location of the vehicle model.

Figure 3A:
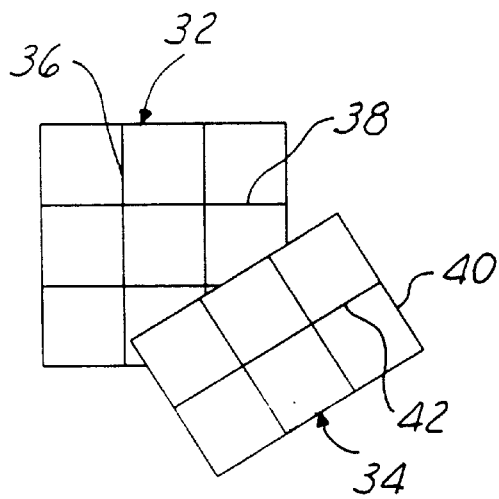
FIGS. 3A and 3B illustrate elements and grids and contacting element-grid pairs.
Figure 3B:
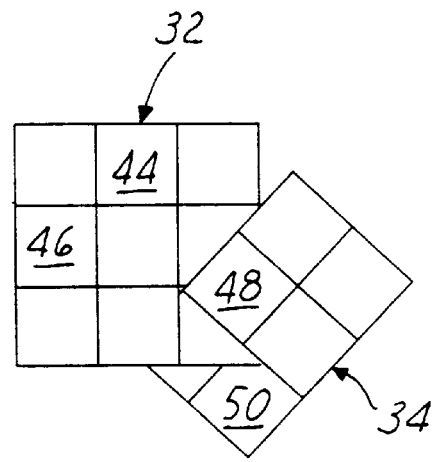
Figure 2:
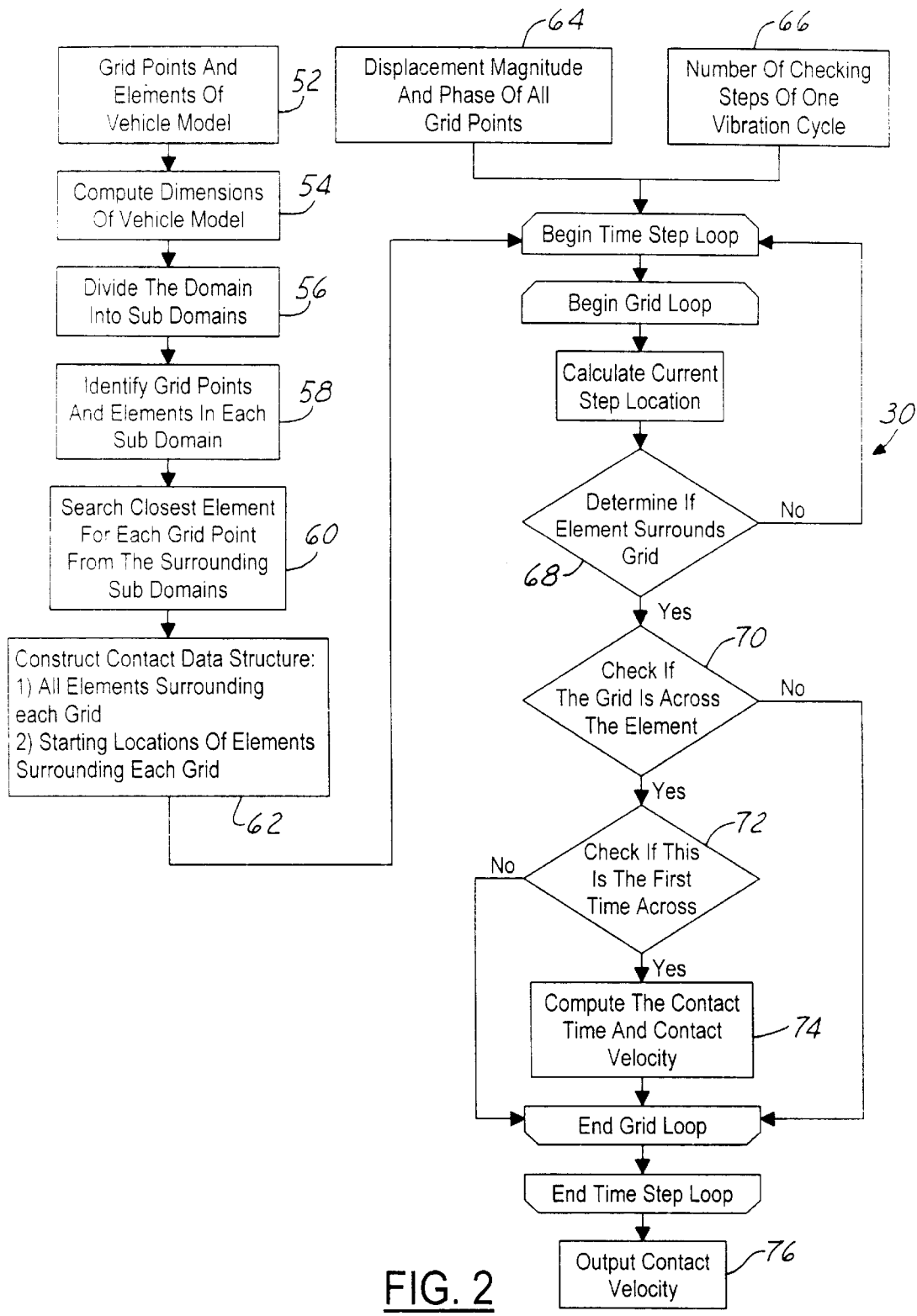
FIG. 2 illustrates a flowchart describing operation of the rattle detection method and system of the present invention.

Referring now to FIGS. 2, 3A, and 3B, the operation of the rattle detection method and system will now be described. FIG. 2 illustrates a flowchart 30 describing operation of the rattle detection method and system. FIGS. 3A and 3B illustrate a pair of grids 32 and 34 of a vehicle model. FIG. 3A illustrates the pair of grids 32 and 34 surrounding each other but not contacting one another. FIG. 3B illustrates the pair of grids 32 and 34 contacting one another.

The vehicle model is divided up into a plurality of grids. Each of the grids includes grid points such as grid points 36 and 38 of grid 32 and grid points 40 and 42 of grid 34. Each of the grid points form elements such as elements 44 and 46 of grid 32 and elements 48 and 50 of grid 34.

Flowchart 30 begins with block 52 providing the grid points and elements of a vehicle model. Each of the elements have a location in space on the vehicle model. Block 54 then computes the maximum and minimum x, y, and z dimensions of the vehicle model. Block 56 then divides the domain of the vehicle model into sub domains. The sub domains are referred to as buckets. Block 58 then identifies the grid points and the elements in each bucket. Block 60 then searches for all elements that can possibly touch a grid point for each grid point. Block 62 then constructs a contact data structure database. The contact data structure database includes all elements surrounding each grid, and the starting locations of the elements surrounding each grid.

After the contact data structure database has been constructed, block 64 provides vibration displacement data for each grid point. The vibration displacement data is indicative of the magnitude and phase felt by each grid point under the excitation. Vibration is a sinusoidal system excitation input having a fixed frequency. Block 66 provides a number of checking steps for each vibration cycle.

The contact data structure database, the vibration displacement data, and the number of checking steps of a cycle are then processed to determine which elements contact and the velocity of the contact. For each time step and each grid, block 68 determines if an element surrounds the grid. Only elements surrounding a grid can contact the grid. If the element does not surround the grid at one instant during the vibration cycle, then the next time instant is checked until the complete vibration cycle has been checked. If block 68 determines that the element surrounds the grid, then block 70 determines if the grid is across the element. If not, then elements are not contacting one another and the grid loop is then finished.

If so, then there is a contacting element-grid pair. Block 72 then determines if this is the first time that the grid is across the element. Block 74 then computes the contact time and contact velocity of the contacting element-grid pair if this is the first time the grid is across the element. The contact time is obtained by interpolating the time between two time steps during a time step loop. From the contact time, the velocity can be determined. Block 76 then outputs the contact velocity.

As stated above, rattle is a function of the contact velocity. A rattle index for each location of the vehicle model can then be generated based on knowing the contact velocity of all the contacting element-grid pairs of the vehicle model. The rattle index allows engineers to objectively evaluate design changes and to conduct design sensitivity analysis. The rattle index can also be further used for component target setting and functional trade off evaluation (rattle risk assessment on weight/cost reduction).

The present invention captures the physics of rattle events by developing a fast contact checking algorithm, i.e., estimating the impact velocity due to element or part contacts driven by system excitation. The present invention eliminates the need of building a complicated non-linear model and running costly nonlinear simulations of impact dynamics. Through an empirical relationship, non-linear contact events are approximated by linear solutions.

The present invention employs intelligent execution in that a bucket sorting concept is employed in the searching algorithm by dividing a vehicle model into smaller buckets for contact element checking. For a CAE model of N elements, the computation time is reduced approximately from $N^2$ to 300N. For a typical vehicle model, the N is around 300,000, which means a 1000 times of computation time saving. This makes rattle checking on an entire vehicle cost and time efficient.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A method for detecting rattle of a vehicle model, the method comprising:

dividing a vehicle model into a plurality of elements and grids;

providing displacement data for each grid of an element as a function of vibration;

using the displacement data to determine element-grid pairs which contact due to vibration;

estimating contact velocity for each contacting element-grid pair due to vibration; and determining rattle for each contacting element-grid pair as a function of contact velocity.

2. The method of claim 1 wherein:

providing displacement data includes providing magnitude data and phase data for each element as a function of vibration.

3. A method for detecting rattle of a vehicle model, the method comprising:

dividing a vehicle model into a plurality of elements and grids;

providing magnitude data for each element as a function of vibration;

providing phase data for each element as a function of vibration;

determining element-grid pairs which contact due to vibration using the magnitude data and the phase data;

estimating contact velocity for each contacting element-grid pair due to vibration; and determining rattle for each contacting element-grid pair as a function of contact velocity.

4. The method of claim 3 further comprising:

identifying each contacting element-grid pair having a rattle magnitude above a predetermined threshold.

5. The method of claim 3 further comprising:

generating a rattle index for each contacting element-grid pair, the rattle index indicative of rattle severity.

6. The method of claim 3 wherein:

dividing a model includes dividing the model into a plurality of buckets, each of the buckets having grid points forming grids and each of the grids having elements;

providing magnitude data includes providing magnitude data for each grid point;

providing phase data includes providing phase data for each grid point; and determining element-grid pairs which contact includes determining grid points of a given grid which contact elements using the magnitude data and the phase data.

7. The method of claim 3 wherein:

dividing a model includes dividing a model into a plurality of buckets, each of the buckets having elements, the method further comprising determining adjacent buckets for each bucket, wherein determining element-grid pairs which contact includes determining element-grid pairs of adjacent buckets which contact due to vibration.

8. The method of claim 3 wherein:

providing magnitude data includes providing magnitude data for each element as a function of vibration over a time period;

providing phase data includes providing phase data for each element as a function of vibration over the time period;

determining element-grid pairs which contact includes determining element-grid pairs which contact due to vibration over the time period using the magnitude data and the phase data;

estimating contact velocity for each contacting element-grid pair includes estimating contact velocity for each contacting element-grid pair due to vibration over the time period; and determining rattle includes determining rattle for each contacting element-grid pair over the time period as a function of contact velocity.

9. A system for detecting rattle of a vehicle model, the system comprising:

a database storing displacement data as a function of vibration for each element of a vehicle model; and a processor operable with the database for determining element-grid pairs which contact due to vibration using the displacement data, the processor further operable for estimating contact velocity for each contacting element-grid pair due to vibration, and for determining rattle for each contacting element-grid pair as a function of contact velocity.

10. The system of claim 9 wherein:

the displacement data includes magnitude data and phase data for each element as a function of vibration.

11. The system of claim 10 wherein:

the magnitude data and the phase data for each element as a function of vibration is over a time period, wherein the processor is further operable for determining element-grid pairs which contact due to vibration over the time period using the magnitude data and the phase data.

12. The system of claim 11 wherein:

the processor is further operable for estimating contact velocity for each contacting element-grid pair due to vibration over the time period, and for determining rattle for each contacting element-grid pair over the time period as a function of contact velocity.

13. The system of claim 9 wherein:

the processor is further operable for identifying each contacting element-grid pair having a rattle severity above a predetermined threshold.

14. The system of claim 9 wherein:

the processor is further operable for generating a rattle index for each contacting element pair, the rattle index indicative of rattle severity.

15. The system of claim 9 wherein:

the processor is operable for dividing the model into a plurality of buckets, each of the buckets having grid points forming grids and each of the grids having elements.

16. The system of claim 15 wherein:

the displacement data includes displacement data for each grid point, the processor further operable for determining grid points of a given grid which contact elements using the displacement data.

17. The system of claim 15 wherein:

the system is further operable for determining element pairs of adjacent buckets which contact due to vibration.

* * * * *